US008738712B2

(12) United States Patent
Moore

(10) Patent No.: US 8,738,712 B2
(45) Date of Patent: May 27, 2014

(54) METHOD AND SYSTEM FOR STORING AND PRESENTING PROGRAM MESSAGES

(75) Inventor: Devin C. Moore, Lewis Center, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1011 days.

(21) Appl. No.: 12/651,042

(22) Filed: Dec. 31, 2009

(65) Prior Publication Data

US 2011/0161436 A1 Jun. 30, 2011

(51) Int. Cl.
*G06F 15/16* (2006.01)
*H04L 12/58* (2006.01)
*G06Q 10/10* (2012.01)
*H04M 1/725* (2006.01)
*G06F 17/30* (2006.01)

(52) U.S. Cl.
CPC ........... *H04L 12/5835* (2013.01); *H04L 12/585* (2013.01); *H04L 12/5855* (2013.01); *G06Q 10/107* (2013.01); *H04M 2250/60* (2013.01); *H04M 1/72552* (2013.01); *G06F 17/30* (2013.01); *G06F 17/30522* (2013.01)
USPC ............ 709/206; 707/737; 715/201; 715/729

(58) Field of Classification Search
CPC .............. H04L 12/5835; H04L 12/585; H04L 12/5855; H04M 2250/60; H04M 1/72552; G06Q 10/107; G06F 17/30; G06F 17/30522
USPC .................... 709/206; 707/737; 715/201, 729
See application file for complete search history.

(56) References Cited

U.S. PATENT DOCUMENTS

| | | | | |
|---|---|---|---|---|
| 5,230,051 | A * | 7/1993 | Quan | 719/312 |
| 6,108,688 | A * | 8/2000 | Nielsen | 709/206 |
| 6,725,228 | B1 * | 4/2004 | Clark et al. | 1/1 |
| 2005/0138552 | A1 * | 6/2005 | Venolia | 715/526 |
| 2005/0144573 | A1 * | 6/2005 | Moody et al. | 715/825 |
| 2005/0203673 | A1 * | 9/2005 | El-Hajj et al. | 701/1 |
| 2006/0010217 | A1 * | 1/2006 | Sood | 709/206 |
| 2007/0208638 | A1 * | 9/2007 | Brown | 705/35 |
| 2008/0140976 | A1 * | 6/2008 | Holt | 711/168 |
| 2008/0153459 | A1 * | 6/2008 | Kansal et al. | 455/412.1 |
| 2009/0013043 | A1 * | 1/2009 | Tan | 709/205 |
| 2009/0204817 | A1 * | 8/2009 | Deana-Roga et al. | 713/171 |
| 2011/0007885 | A1 * | 1/2011 | Kirchhoff et al. | 379/100.17 |
| 2011/0113375 | A1 * | 5/2011 | Moody et al. | 715/825 |
| 2011/0154040 | A1 * | 6/2011 | Bheemanna | 713/170 |
| 2011/0161436 | A1 * | 6/2011 | Moore | 709/206 |
| 2012/0303693 | A1 * | 11/2012 | Karmakar et al. | 709/201 |

* cited by examiner

Primary Examiner — Oleg Survillo

(57) ABSTRACT

An approach is provided for a messaging interface between applications and a user. A plurality of messages associated respectively with a plurality of programs is stored in a common message database according to timing information corresponding to the messages. A subset of the messages is retrieved based on the timing information. The subset of messages is filtered based on message type. The filtered messages are output to a non-visual communication program for presentation of the filtered messages.

17 Claims, 8 Drawing Sheets

METHOD AND SYSTEM FOR STORING AND PRESENTING PROGRAM MESSAGES

BACKGROUND INFORMATION

The advent of the World Wide Web and advances in technology have served as a catalyst for the ubiquity of computing devices, as well as the introduction of increasingly more complex applications and services. For example, such services may utilize complex, multimodal interfaces to input and output information. Moreover, these computing devices continue to gain ever increasing processing capability such that multitasking is now commonplace. Consequently, a host of applications and associated interfaces are activated concurrently. Because of the multiplicity of applications, the users can easily be inundated with messages from these applications, thereby potentially reducing the user's productivity or efficiency with respect to utilizing the applications. Thus, management of these messages, which may be voluminous, poses a challenge for traditional operating systems.

The above issue is exacerbated in the case of users with vision impairment; such users may typically rely on a screen reader to convey the information provided by the many applications. Unfortunately, the lack of management of the messages from these applications can easily render the output of the screen reader incoherent or incomprehensible.

Therefore, there is a need for an approach that can effectively manage application messages for coherent presentation to users.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing a messaging interface are disclosed. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to interfacing with vision impaired individuals, it is contemplated that various exemplary embodiments are applicable to other use cases.

Figure 1:
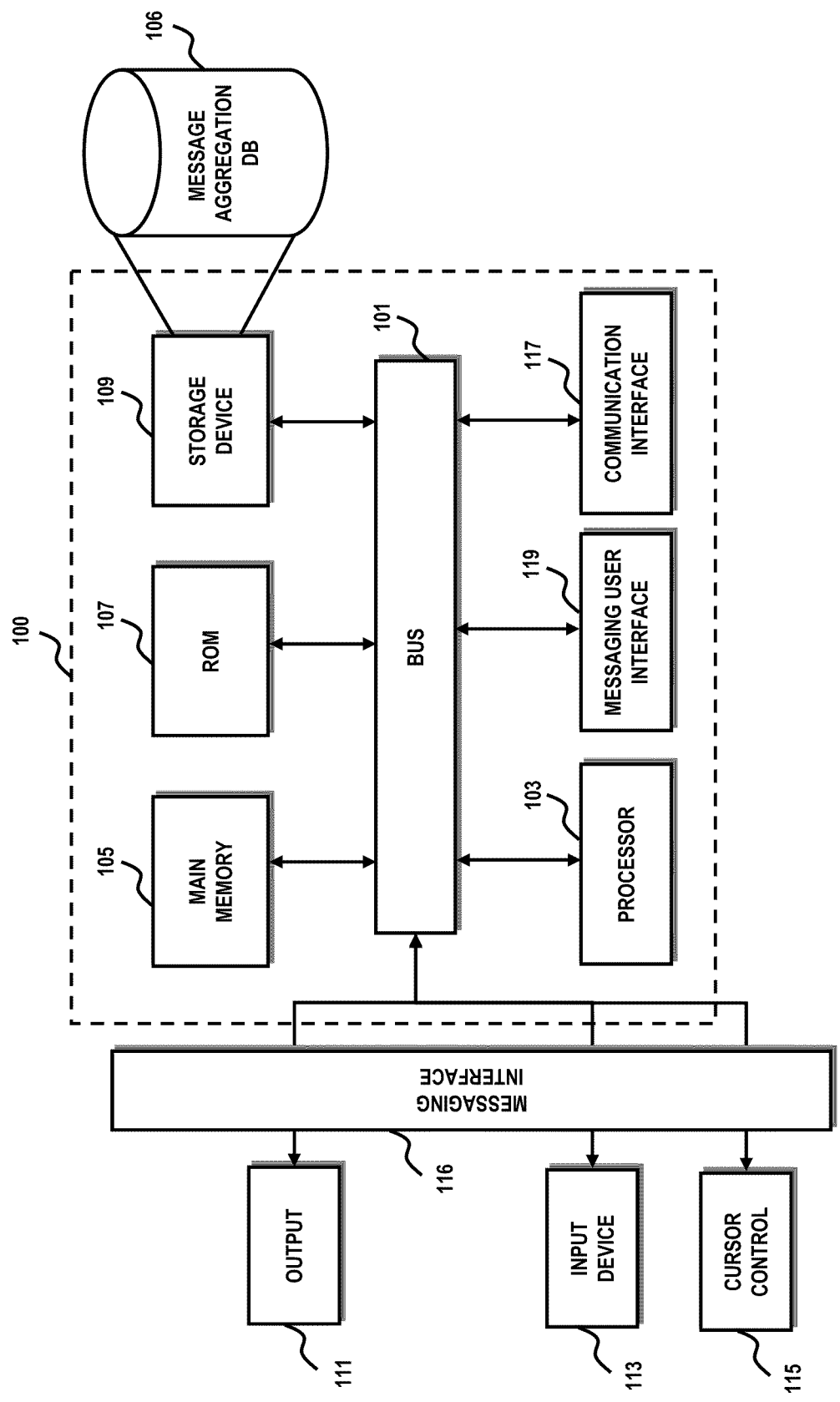
FIG. 1 is a diagram of a system capable of presenting program information via a messaging interface, according to an exemplary embodiment.

FIG. 1 is a diagram of a system capable of presenting program information via a messaging interface, according to an exemplary embodiment. As previously noted, user interfaces for applications executing on computing devices have become increasingly complex with respect to the sophistication of the interfaces as well as managing information in light of the number of interfaces. These user interfaces are generally designed for presentation to individuals without any visual impairments. In other words, traditionally there is a lack of an effective messaging interface to organize the multitude of information output from the various processes of the computing devices. Therefore, a messaging interface that is optimized for non-visual communications is needed.

Software for providing interfaces to users with visual impairments may include, for example, screen-readers. In certain embodiments, a screen-reader is a software and/or hardware application that may identify and interpret what is displayed on a screen (e.g., via a standard output). Then, the screen-reader can present the display via another mode of communication (e.g., a text-to-speech engine, sound icons, a Braille output device, etc.). The use of screen-readers to present information on computing devices to users generates compatibility issues between applications and output via the screen-reader.

Therefore, the approach of utilizing a messaging interface organize information stemming from programs of the computer system 100 is provided. As shown, computing hardware (e.g., computer system) 100 includes a bus 101 or other communication mechanism for communicating information and a processor 103 coupled to the bus 101 for processing information. The computer system 100 also includes main memory 105, such as a random access memory (RAM) or other dynamic storage device, coupled to the bus 101 for storing information and instructions to be executed by the processor 103.

Messages associated with applications and other software (e.g., the operating system, drivers, etc.) may be stored in a message aggregation database 106. In certain embodiments, messages are system communication, events, program (e.g., application, operating system, process, etc.) outputs, program communications, etc. that are monitored by a messaging system and/or framework and are output to the message aggregation database 106. Although various embodiments are described with respect to applications, it is contemplated that the approaches described herein may be used with other programs (e.g., other processes, the operating system, drivers, etc.).

Main memory 105 can also be used for storing temporary variables or other intermediate information during execution of instructions by the processor 103. The computer system 100 may further include a read only memory (ROM) 107 or other static storage device coupled to the bus 101 for storing static information and instructions for the processor 103. A storage device 109, such as a magnetic disk or optical disk, is coupled to the bus 101 for persistently storing information and instructions. The computing system 100 is any type of fixed terminal, mobile terminal, or portable terminal including a desktop computer, laptop computer, Personal Digital Assistant (PDA), communicator, internet node, device, mobile device, or any combination thereof.

The computer system 100 may be coupled via the bus 101 to an output 111, such as a display (e.g., cathode ray tube (CRT), liquid crystal display, active matrix display, or plasma display, for displaying information to a computer user), an audio output, a Braille output, etc. In certain embodiments, the audio output may be implemented using an amplifier and a speaker. Moreover, the Braille output may be implemented via a refreshable Braille display or Braille terminal. A refreshable Braille display may include electro-mechanical devices that include means for raising dots through holes of a flat surface to allow for Braille characters to be recognized. In certain embodiments, the audio output may receive instructions from a text-to-speech engine, while the Braille terminal may receive output instructions a Braille output engine. An input device 113, such as a keyboard including alphanumeric and other keys, is coupled to the bus 101 for communicating information and command selections to the processor 103. Another type of user input device is a cursor control 115, such as a mouse, a trackball, or cursor direction keys, for communicating direction information and command selections to the processor 103 and for controlling cursor movement on the display of the output 111.

The messaging interface 116 may be utilized to present textual messages of an application to the user and/or to provide input from a user to the application. As such, in certain embodiments, the output 111, the input device 113, and the cursor control 115 may communicate with the bus via the messaging interface 116. In other embodiments, the output 111, the input device 113, and the cursor control 115 may be directly coupled to the bus 101.

As noted above, in certain embodiments, the message aggregation database 106 may be utilized to collect messages from programs, e.g., applications, operating systems, and other software, executing on the processor 103. These messages may be formatted and stored in the message aggregation database 106. These messages may be generated and sorted as further detailed in the description of FIG. 2A. Examples of messages include e-mails, web page information, log file information, screen scraper output, alerts to the operating system, input information, or the like.

According to one embodiment, the messages may be formatted into a screen-reader compatible format that may be utilized for outputting to a non-visual output (e.g., an audio output, a Braille output, etc.). In other words, the messages may be formatted in a standard format that may be output in a non-visual manner. In certain embodiments, all messages are formatted to be screen-reader compatible. Further, the message aggregation database 106 may be utilized to output messages to a messaging user interface 119 to allow the user to navigate and communicate with applications using messages. The messaging user interface 119, detailed further in FIGS. 9 and 10, may additionally be utilized as a simple navigation interface that can be effortlessly sorted and presented to the user. Thus, the messaging user interface 119 may be utilized to navigate and utilize programs. Further, messages may be viewed by the user using a message scrolling user interface. As such, the user may be alerted to new messages using push technology, where the messaging system provides a notification to the user when a new message meeting the user's criteria is available. By way of example, the criteria may include certain types of messages, messages associated with a particular application, importance of messages, etc.

Under certain scenarios, the messaging user interface 119 may be presented to the user as a home screen navigation menu system. As such, the messaging user interface 119 may be viewed as a message explorer used to navigate the functionality of applications and operating system functions. Moreover, the message explorer may be utilized to present a view of the messages stored in the message aggregation database 106. Additionally or alternatively, the message explorer may include a universal notification window that provides the user with all of the messages available in the message aggregation database 106. Some or all of the messages may be restricted by size (e.g., only a certain amount of messages of a particular type, such as system input/output notification messages, may be stored at a time). The message explorer may thus provide access to a log of the messages and/or other operating system or application data.

According to one embodiment, the processes described herein are performed by the computer system 100, in response to the processor 103 executing an arrangement of instructions contained in main memory 105. Such instructions can be read into main memory 105 from another computer-readable medium, such as the storage device 109. Execution of the arrangement of instructions contained in main memory 105 causes the processor 103 to perform the process steps described herein. One or more processors in a multi-processing arrangement may also be employed to execute the instructions contained in main memory 105. In alternative embodiments, hard-wired circuitry may be used in place of or in combination with software instructions to implement certain embodiments. Thus, embodiments of the invention are not limited to any specific combination of hardware circuitry and software.

The computer system 100 also includes a communication interface 117 coupled to bus 101. The communication interface 117 provides a two-way data communication coupling to a network link connected to a local network. For example, the communication interface 117 may be a digital subscriber line (DSL) card or modem, an integrated services digital network (ISDN) card, a cable modem, a telephone modem, or any other communication interface to provide a data communication connection to a corresponding type of communication line. As another example, communication interface 117 may be a local area network (LAN) card (e.g. for Ethernet™ or an Asynchronous Transfer Model (ATM) network) to provide a data communication connection to a compatible LAN. Wireless links can also be implemented. In any such implementation, communication interface 117 sends and receives electrical, electromagnetic, or optical signals that carry digital data streams representing various types of information. Further, the communication interface 117 can include peripheral interface devices, such as a Universal Serial Bus (USB) interface, a PCMCIA (Personal Computer Memory Card International Association) interface, etc. Although a single communication interface 117 is depicted in FIG. 1, multiple communication interfaces can also be employed.

The network link typically provides data communication through one or more networks to other data devices. For example, the network link may provide a connection through local network to a host computer, which has connectivity to a network (e.g. a wide area network (WAN) or the global packet data communication network now commonly referred to as the "Internet") or to data equipment operated by a service provider. The local network and the network both use electrical, electromagnetic, or optical signals to convey information and instructions. The signals through the various networks and the signals on the network link and through the communication interface 117, which communicate digital data with the computer system 100, are exemplary forms of carrier waves bearing the information and instructions.

The computer system 100 can send message data and receive data, including program code, through the network(s), the network link, and the communication interface 117. In the Internet example, a server (not shown) might transmit requested code belonging to an application program for implementing certain embodiments through the network, the local network and the communication interface 117. The processor 103 may execute the transmitted code while being received and/or store the code in the storage device 109, or other non-volatile storage for later execution. In this manner, the computer system 100 may obtain application code in the form of a carrier wave.

The term "computer-readable medium" as used herein refers to any medium that participates in providing instructions to the processor 103 for execution. Such a medium may take many forms, including but not limited to computer-readable storage media ((or non-transitory media)—i.e., non-volatile media and volatile media), and transmission media. Non-volatile media include, for example, optical or magnetic disks, such as the storage device 109. Volatile media include dynamic memory, such as main memory 105. Transmission media include coaxial cables, copper wire and fiber optics, including the wires that comprise the bus 101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

The processes described herein for providing a messaging interface between applications and users may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed above.

Figure 2A:
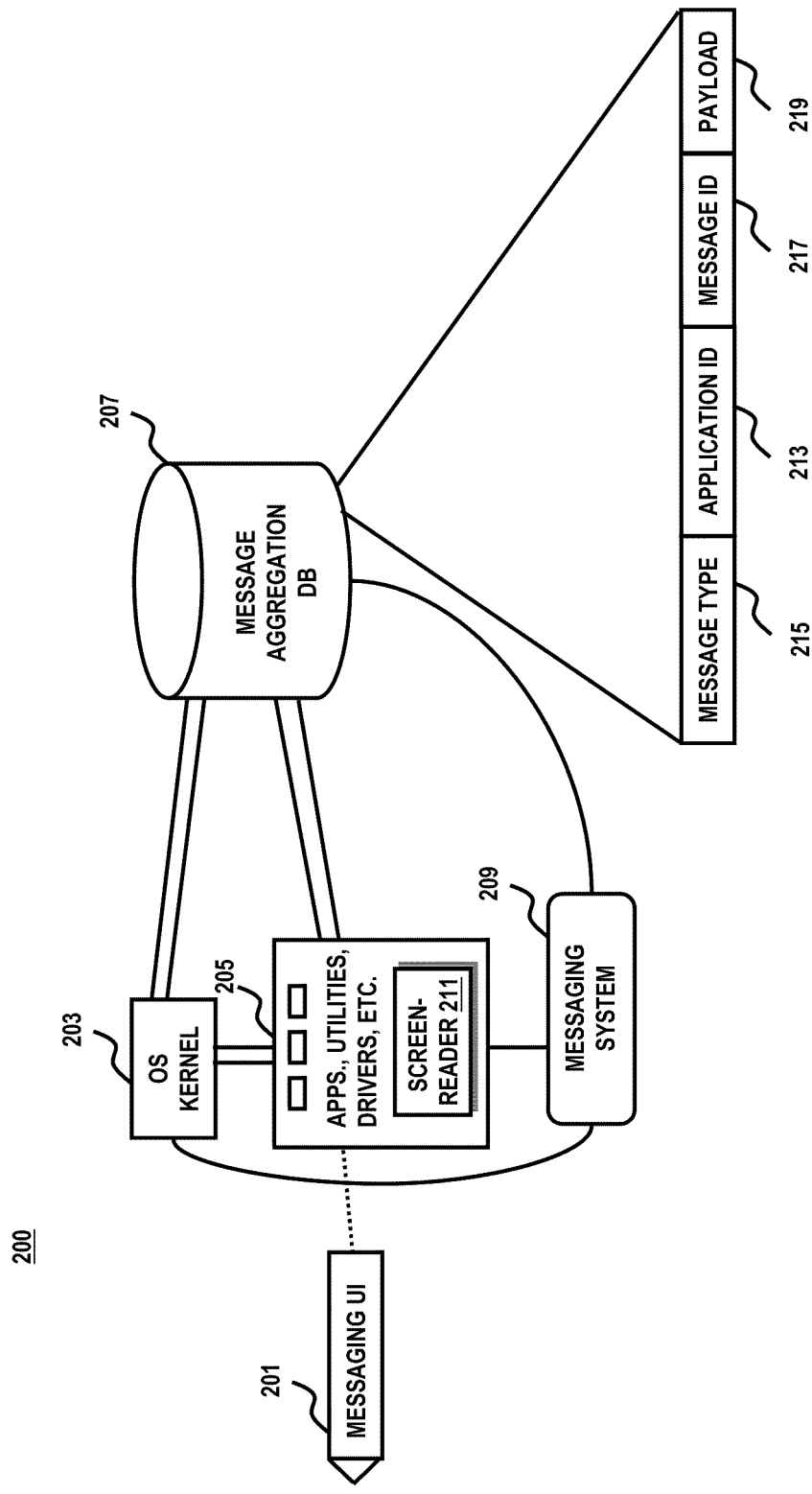
FIG. 2A is a diagram of a software system architecture to generate and present messaging information via a messaging user interface, according to an exemplary embodiment.

FIG. 2A is a diagram of a software system architecture 200 to generate and present messaging information via a messaging user interface (UI) 201, according to one embodiment. As shown, an operating system kernel 203 as well as other programs 205 may be utilized to populate a message aggregation database 207 according to a messaging system 209. As noted above, in some embodiments, a program 205 is a set of instructions for execution by a computer system 100. Examples of programs include the operating system kernel 203, applications, utilities, drivers, etc. In certain embodiments, the messaging system 209 is a program 205 that monitors and controls the creation of information to the message aggregation database 207 and/or messaging UI 201. Further, in some embodiments, the message aggregation database 207 includes a flat file database (e.g., a table database model in a plain text format), a relational database, a combination thereof, etc. The messaging system 209 may be a part of the operating system, an external application, a framework, etc. As such, the messaging system 209 may have access to operating system functions and application hooks. An operating system kernel 203 is utilized to bridge programs 205 with the computer system hardware described in FIG. 1. As such, the operating system kernel 203 provides an abstraction layer between the programs 205 and the computer system hardware. Further, the messaging system 209 may be utilized as an abstraction layer between the operating system kernel 203 and/or programs 205 and the messaging UI 201.

Figure 4:
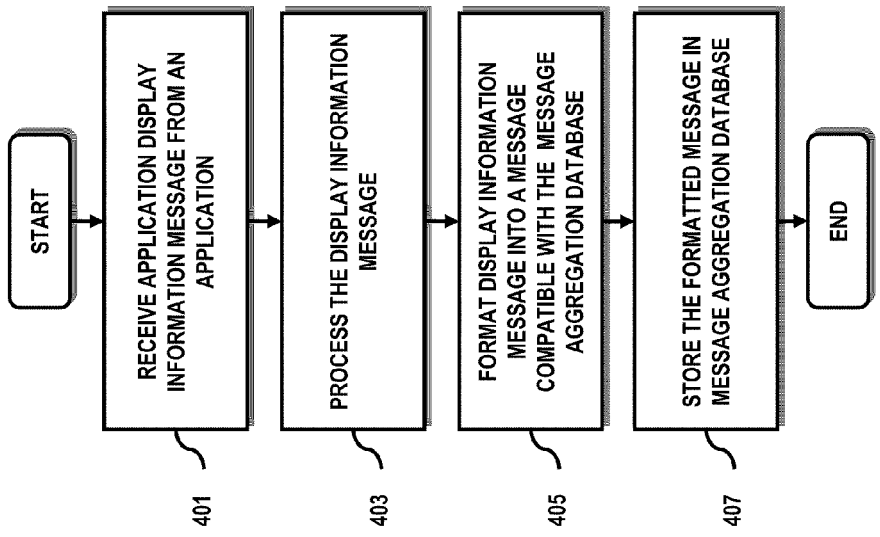
FIG. 4 is a flowchart of a process for generating textual message information from an output of an application, according to an exemplary embodiment.
Figure 3:
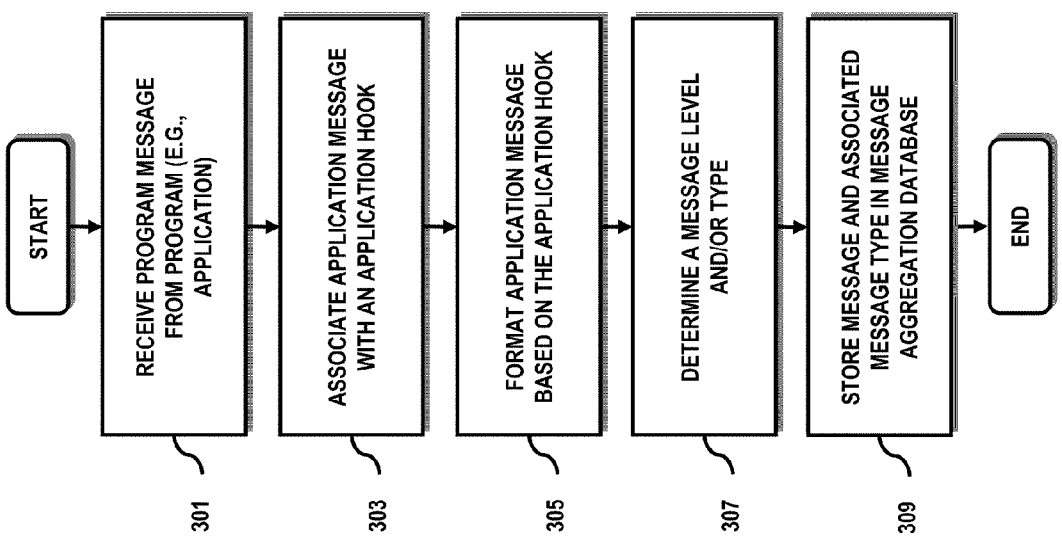
FIG. 3 is a flowchart of a process for generating and storing messages in a message aggregation database, according to an exemplary embodiment.

As previously noted, the message aggregation database 207 is populated using the operating system kernel 203 and/or other programs 205 (e.g., applications) using the processes detailed in FIGS. 3 and 4. In certain embodiments, a screen-reader application 211 is a non-visual communication program that is utilized to convert application messages (e.g., an application output) into a format (e.g., textual messages) that may be interpreted and presented by a non-visual output device (e.g., a text-to-speech output device or a Braille output device). Additionally, in some embodiments, a screen-reader compatible output is an output device that may interpret textual information into a sense (e.g., a touch, a sound, etc.) that may be utilized to communicate the textual information. As such, the content of messages stored in the message aggregation database 207 may be utilized to provide input to the screen-reader 211 for outputting information to a user. Messages stored in the message aggregation database 207 can be associated with applications using a message application identifier 213 (e.g., a name) and/or a message application source identifier. A message application source identifier may be a memory address identifying the location of the program 205 that may be updated or changed by the operating system kernel 203. Further, messages stored in the message aggregation database 207 may be associated with a message type 215. The message type 215 may include a message type identifier and/or a message type name. Moreover, the message type name may include a descriptive message type (e.g., an application output message to be output to a user, an identifier message identifying a program 205, a status message updating the status of the computer system 100, etc.). Further, the messages may be associated with a message identifier 217 and/or a payload 219. In certain embodiments, the message identifier 217 is descriptive of the payload 219 (e.g., a summary). In other embodiments, the message identifier 217 may include a unique identifier used to uniquely specify the message. Moreover, the message identifier 217 may be both descriptive and unique (e.g., include a descriptive identifier as well as a unique identifier such as a time stamp). Further, the message may be associated with timing information (not shown) that may be utilized to filter and/or sort messages.

In certain embodiments, the message type identifier includes an identifier that is utilized in sorting the messages in the message aggregation database 207. For example, a message type identifier can be associated with one or more levels of messages. A level may be utilized to identify the frequency of update of the message type and/or importance of the message (e.g., via a priority level). By way of example, the messaging system 209 may be utilized to configure the levels of messages stored in the message aggregation database 207 using parameters. For example, the level of a particular message can be provide that the message is less important if the message type of the message is a message type that is frequently updated (e.g., the message is associated with a continuous stream of information that is not outputted). In another example, the level of another message may indicate a higher priority because the other message is meant to be presented to the user. Thus, the message aggregation database 207 may be sorted using priority levels. In certain scenarios, the message priority level of messages may be utilized to filter out lower priority messages. By way of example, the messaging system 209 may include, for example, multiple levels (e.g., 20) that may be associated with messages in the message aggregation database 207. The messaging system 209 can be configured to filter out all messages other than levels 1, 2, 3, and 5 from being displayed to the user. Further, the remaining messages may be sorted based on additional parameters (e.g., date of the message).

Figure 5:
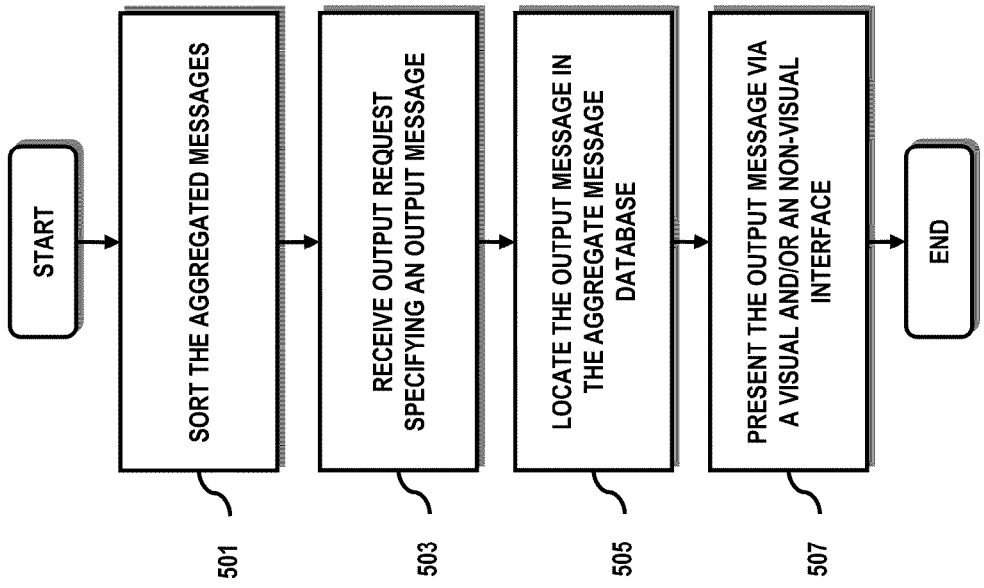
FIG. 5 is a flowchart of a process for presenting message information from a message aggregation database, according to an exemplary embodiment.
Figure 8:
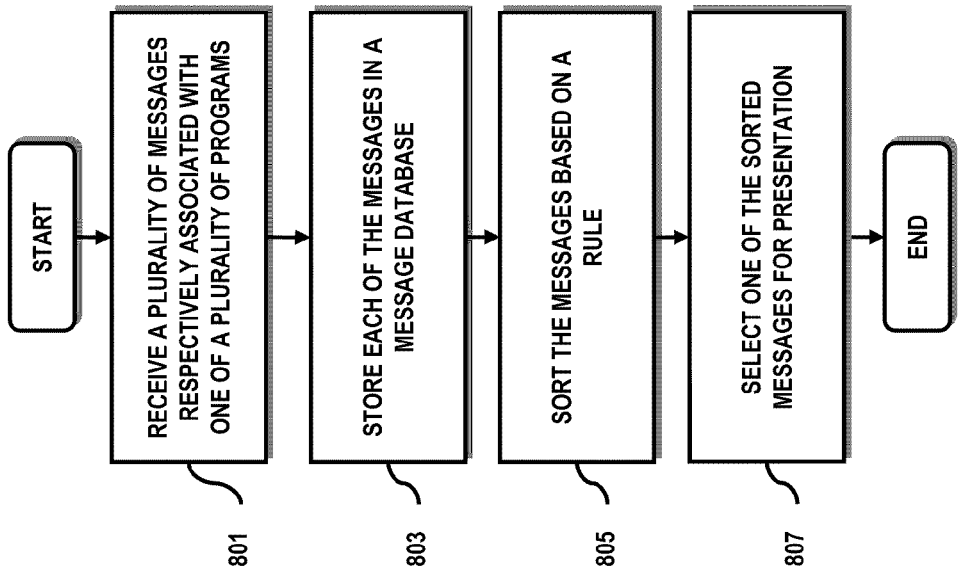
FIG. 8 is a flowchart of a process for generating and sorting messages for presentation, according to an exemplary embodiment.
Figure 9:
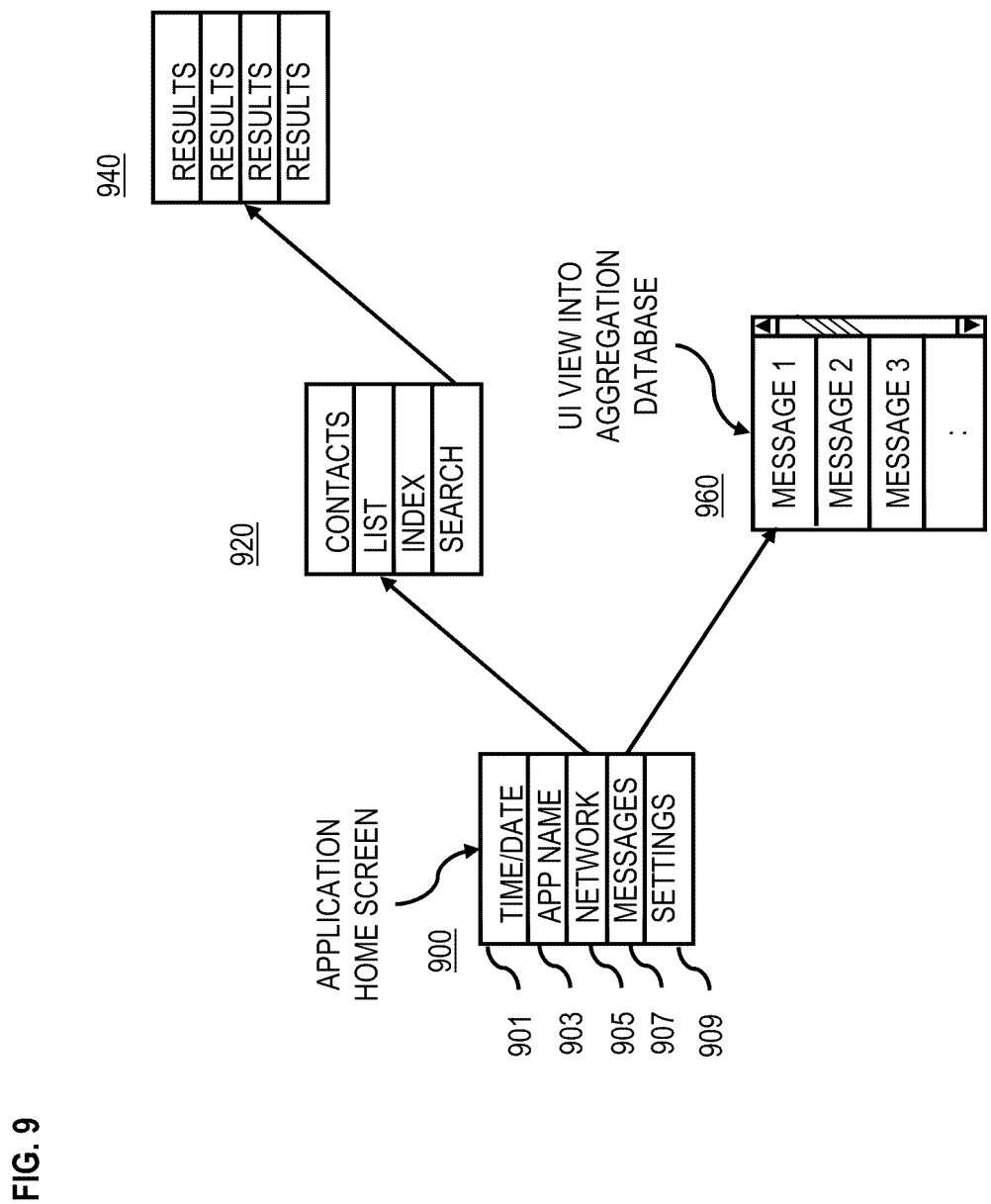
FIGS. 9 and 10 are diagrams of user interfaces for viewing information from a message aggregation database, according to various exemplary embodiments.

Moreover, the messaging system 209 may configure the presentation of the message aggregation database 207 and output information contained within the message aggregation database 207 via the messaging UI 201 as further detailed in the processes of FIG. 5 and user interfaces in FIGS. 8 and 9. As such, the messaging UI 201 may be utilized to present menus of messages associated with programs 205. The messages may be formatted so that functions and sub-functions are broken up into menus of a limited number of menu items (e.g., 3-5 menu items, 5-7 menu items, etc.) for interaction with a program 205. In this manner, the menus may be quickly provided to the user for input selecting the functions and/or sub-functions. Moreover, the menus and/or menu navigation may additionally include next, back, and/or previous navigation options. In certain embodiments, these navigation options are forced on all applications running on the operating system kernel 203. Further, the messaging UI 201 may additionally force an associated application to disable backgrounds, font size customization, and haptic feedback control. In this manner, the computer system 100 may be more suited for visually impaired individuals. Additionally or alternatively, the messaging UI 201 may be sorted based on parameters (e.g., based on a most recent date/time, another database column, etc.). Moreover, the messaging UI 201 can be presented to the user via a screen-reader compatible output.

Figure 2B:
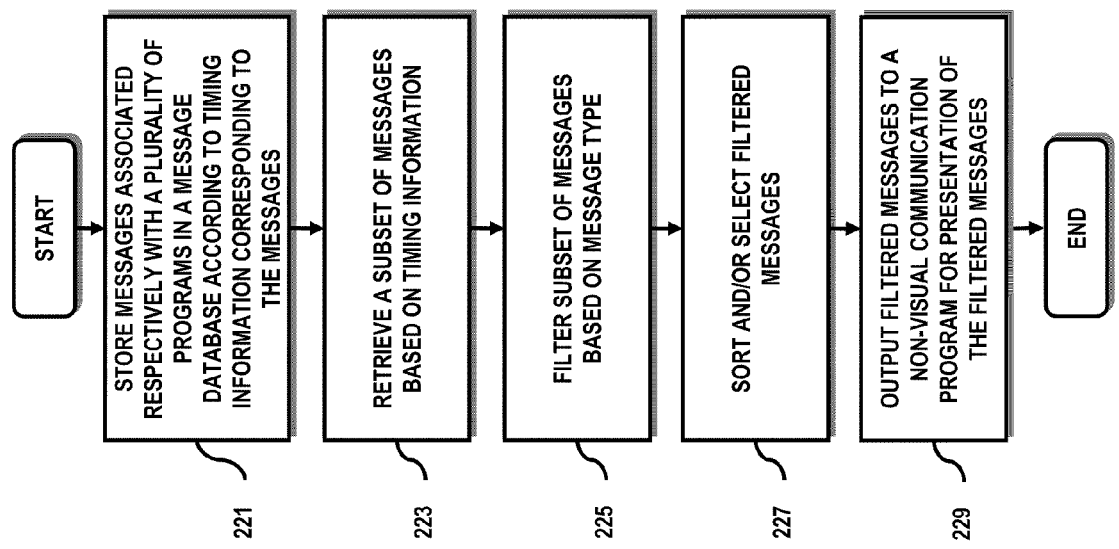
FIG. 2B is a flowchart of a process for storing and filtering messages for non-visual communication presentation, according to an exemplary embodiment.

FIG. 2B is a flowchart of a process for storing and filtering messages for non-visual communication presentation, according to an exemplary embodiment. For illustrative purposes, the process is described with reference to FIGS. 1 and 2. It is noted that the steps of the process may be performed in any suitable order, as well as combined or separated in any suitable manner. In certain embodiments, the messaging system 209 performs the process and executes on the computer system 100 (e.g., on the processor 103 and utilizing the main memory 105). At step 221, the messaging system 209 stores a plurality of messages associated respectively with a plurality of programs in a message aggregation database 207 according to timing information (e.g., timestamp) corresponding to the messages. In certain embodiments, the message aggregation database 207 a database common to one or more programs of the computer system 100. Further the timing information may include a timestamp or date information that can used to determine when a message was created or last used. In certain embodiments, the timing information need not be stored in the message aggregation database 207, but reflects the order of messages received. Further, the messages may include a message type field that specifies a corresponding message type, an application identifier field that identifies the corresponding program, a message identifier field that identifies the message, and payload information. In certain embodiments, the payload information includes screen-reader compatible information (e.g., textual information). Message generation and storage is further detailed in the processes of FIGS. 3 and 4.

Then, at step 223, the messaging system 209 retrieves a subset of the messages based, at least in part, on the timing information. As noted, the timing information may be utilized to determine which messages are most recent and consequently least stale. Further, the timing information may be utilized to select a group of messages. This may be reflected in selecting a group of messages surrounding a particular message. In other scenarios, the timing information may be utilized to retrieve older messages. This subset may be utilized as a working copy of the message aggregation database 207. Further, in certain scenarios, the subset may include a pointer to the location of payload information in the message aggregation database 207 to save memory space and increase processing efficiency.

The messaging system 209 filters the subset of messages based on the message type (step 225). As previously noted, the message type may be associated with priority levels and/or be used to select which messages can be eligible candidates for presentation. One or more message types can be selected as candidates for presentation and/or one or more message types may be selected to be filtered out of possible candidates for presentation. Thus, the subset of messages may be filtered based on message type and timing information rules. Then, the filtered message subset is sorted (step 227). Further, the sorting may be executed according to sorting criteria. The sorting criteria may include sorting the filtered messages via one of the associated fields associated with the messages. The messaging system 209 may receive input from a selectable user interface to receive input to select sorting criteria. In one example, the application identifier field may be utilized to sort the messages. In this example, a user may utilize selection menu of the selectable user interface to sort messages so that messages for a particular application may be presented. Selectable user interfaces are further detailed in description of FIGS. 9 and 10.

Next, at step 229, the messaging system 209 outputs filtered messages to a non-visual communication program for presentation of the filtered messages. The non-visual communication program may include a screen-reader 211 and generate data that can be transmitted via an output signal to output 111. As previously noted, the output 111 may include an auditory system or a touch-based system to communicate the payload 219 of messages.

FIG. 3 is a flowchart of a process for generating and storing information in a message aggregation database, according to an exemplary embodiment. For illustrative purposes, the process is described with reference to FIGS. 1 and 2. It is noted that the steps of the process may be performed in any suitable order, as well as combined or separated in any suitable manner. In certain embodiments, the messaging system 209 performs the process and executes on the computer system 100 (e.g., via the processor 103). At step 301, the messaging system 209 receives an application message from a program 205 (e.g., an application). The application may trigger the attention of the messaging system 209 via an interrupt, a key event, or a hook. In certain embodiments, hooking is technique used to alter or augment the behavior of an operating system, applications, or other software. Hooking may alter the behavior by intercepting function calls, messages, or events passed between software components. Using this approach, a hook is code that handles the intercepted function calls, messages, or events. As noted above, the messaging system 209 may be an application, the operating system, etc. that has access (e.g., administrator privileges) to utilize hooks. Different hooks may be utilized to handle different intercepted function calls, messages, or events in different manners (e.g., according to different configuration parameters). A hook can be triggered based on notification by the application (e.g., a new e-mail alert from an e-mail application, a new completed web page load from a web browser, another update notification (e.g., a log file update or a graphical user interface (GUI) update), etc.).

Once the messaging system 209 receives the application message, the messaging system 209 associates the application message with an application hook (step 303). The application hook may associate the application with the message and handle the message in a manner provided by the application hook. The manner provided by the application hook may depend on configuration parameters associated with the application. For example, the application hook associated with an e-mail message or other messaging system message may include different information than the application message associated with the content of a web browser or other application (e.g., an application with a GUI or an application with output to a log file). In certain embodiments, the application hooks may be associated with a software framework associated with the application. In this manner, applications created using the framework will be known to be compatible with the messaging system and application hooks. Then, at step 305, the messaging system 209 formats the application message into a textual message based on the application hook as further detailed in the processes of FIG. 4. In certain embodiments, the textual message is a message that can be interpreted by a screen-reader compatible output device.

Next, at step 307, the application hook is used to determine a message level and/or message type for the textual message. The message type can be provided in the application message. Examples of message types include an e-mail message, a text message (e.g., Short Message Service (SMS), Multimedia Messaging Service (MMS)), a message containing textual web browser information, a message containing updated GUI information, a message containing internal system alerts (e.g., an alert associated with the hook or an alert associated with other events), internal system log and/or error update messages, etc. For example, messages associated with new content information may be associated with a higher priority level than a message associated with an internal system log update or other information that is frequently updated and/or may not be useful to the user. Thus, the message types may be associated with message priority levels. These message priority levels may be utilized to filter content to be displayed to a user via a menu system as further detailed in FIGS. 5, 6, 9, and 10. For example, a user may configure the messaging system 209 to only display and/or alert the user to messages associated with certain priority levels and/or message types.

Further, the messaging system 209 may be utilized to store the formatted message and associated message type in the message aggregation database 207 (step 309). In certain embodiments, the message aggregation database 207 may store a message identifier, a message application identifier, a message type identifier and/or message priority level, message payload 219 (e.g., text), timing information (e.g., a timestamp, a date added, etc.), or a combination thereof associated with each message. Further, the message information may be customized based on the message type. Moreover, the application message may be determined to have emphasis (e.g., bold, quotes, underline, italics, etc.) based on textual information in the payload 219 that may be stored in the message aggregation database 207. The textual information may include one or more tags that may be utilized to produce the emphasis on a screen-reader. Moreover, an application message that is associated with web content may include HyperText Markup Language (HTML) text with emphasis information that may be utilized by an output (e.g., a text-to-speech mechanism, a Braille output device, display, etc.).

FIG. 4 is a flowchart of a process for generating textual message information from an output of an application, according to an exemplary embodiment. For illustrative purposes, the process is described with reference to FIGS. 1 and 2. It is noted that the steps of the process may be performed in any suitable order, as well as combined or separated in any suitable manner. In certain embodiments, the messaging system 209 performs the process and executes on the computer system 100 (e.g., utilizing the processor 103). At step 401, the messaging system 209 receives an application display information message from a program 205 (e.g., application). As noted in the processes of FIG. 3, the application display information message may be associated with an application hook or other notification mechanism (e.g., an interrupt, another alert, etc.) notifying the messaging system 209 of the availability of the application display information message. In certain embodiments, application display information message is an application message that is associated with content information associated with a GUI or that is intended to be presented to the user via the messaging system 209.

Then, at step 403, the messaging system 209 processes the display information message to determine a payload 219 (e.g., textual information) associated with the display information message. The display information message may be processed using various rules that may be based on the type of message and/or an application hook associated with the message. Then, at step 405, the textual information is formatted into a message that can be stored in the message aggregation database 207.

In one embodiment, the display information message is associated with an electronic message or mail. The payload 219 may be directly extracted from the electronic message or mail. Further, fields associated with the electronic message or mail may be formatted to be included in the textual information (e.g., fields for timing information associated with the message or mail, subject information, summary information, preview information, contact information (e.g., of a contact sending the message or mail), a combination thereof, etc.).

In another embodiment, the display information message is associated with web browser content. In this embodiment, the HTML text content may be extracted from the HTML document by removing associated tags. Additionally or alternatively, the web browser may utilize a Really Simple Syndication (RSS) web feed to retrieve web browser content. With this approach, the RSS textual web content may be extracted. In both the web page content and RSS feed content, the textual information may be separated into sections (e.g., web URLs, sections based on a Document Object Model (DOM), sections of metadata associated with the RSS feed (e.g., publishing dates, authorship, summary, full text, other fields, etc.), a combination thereof, etc.). Each of these sections may correspond to messages that can be presented to the user (e.g., via a screen-reader compatible output).

In yet another embodiment, the display information message may be included as a portion of an output log including the textual information, time information, an identifier (e.g., a name, title, heading, etc.), or a combination thereof. The output log may be set up according to rules provided by the messaging system 209 (e.g., the application may be based on a framework associated with the messaging system 209). In this manner, the messaging system 209 has control of how the updates in the log are performed and/or the format of the textual information (e.g., headings, summary information, full text information, etc.). The rules may include formatting rules, text size rules, etc. Additionally or alternatively, the output log may be set up according to rules provided by or compatible with the messaging system 209 (e.g., using a standard output format or an output format known to the messaging system 209).

In a further embodiment, the display information message may be associated with a GUI. The messaging system 209 may utilize a screen scraper and/or optical character recognition (OCR) to recognize textual information output to a display of the computer system 100. As noted above, the screen scraper may additionally determine an emphasis of textual information included in the display information. Moreover, the display information may be formatted according to rules (e.g., a recognized bold font with a certain font size is associated with a heading; recognized text may be grouped into sections based on placement, etc.).

Then, at step 407, the messaging system 209 stores the formatted message in the message aggregation database 207. As mentioned above, in certain embodiments, the database may include a message identifier, an application identifier, a message type, message text, and timing information. Further, as described above, the message text may include one or more subcategories or fields of information.

FIG. 5 is a flowchart of a process for presenting message information from a message aggregation database, according to an exemplary embodiment. For illustrative purposes, the process is described with reference to FIGS. 1 and 2. It is noted that the steps of the process may be performed in any suitable order, as well as combined or separated in any suitable manner. In certain embodiments, the messaging system 209 performs the process and executes on the computer system 100 (e.g., on the processor 103). At step 501, the messaging system 209 sorts aggregated messages in the message aggregation database 207. In certain scenarios, the messages are sorted via timing information (e.g., a timestamp, date, time, etc.). For example, the aggregated messages may be sorted in a reverse date order (where the most recent messages are sorted to the top). In this manner, the most up to date and most likely to be pertinent messages are sorted to the top. Further, the reverse date order may be set as a default setting by the messaging system 209. Moreover, other sort settings may be utilized based on other categories associated with the message aggregation database 207 (e.g., based on a message type, a message application identifier, message text fields, a combination thereof, etc.).

At step 503, the messaging system 209 receives an output request specifying an output message. The request may be specified using an input device 113. As further detailed in FIGS. 9 and 10, the input device 113 may specify the output message using arrow keys to navigate a menu of a selectable user interface. Based on the request, the output message is located in the message aggregation database 207 (step 505). The output message may include one or more fields of textual information. Further, the textual information can be compatible with a screen-reader. Then, at step 507, the messaging system 209 presents the output message via one or more output interface (e.g., audio, video, Braille, a combination thereof, etc.). In certain embodiments, at least one of the output interfaces includes a non-visual output (e.g., an audio or touch-based output).

Figure 6:
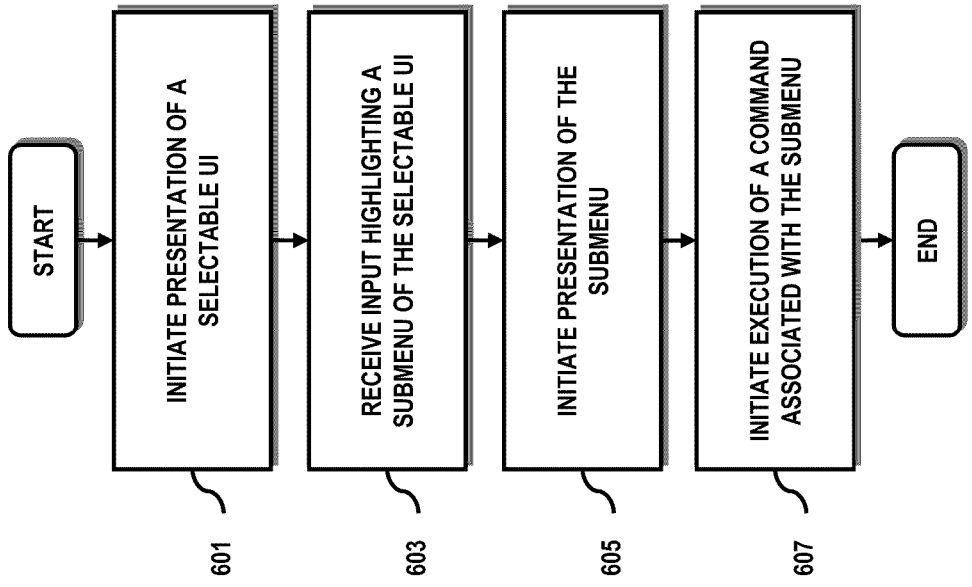
FIG. 6 is a flowchart of a process for navigating a message aggregation database, according to an exemplary embodiment.

FIG. 6 is a flowchart of a process for navigating a message aggregation database, according to an exemplary embodiment. For illustrative purposes, the process is described with reference to FIGS. 1 and 2. It is noted that the steps of the process may be performed in any suitable order, as well as combined or separated in any suitable manner. In certain embodiments, the messaging system 209 performs the process and executes on the computer system 100 (e.g., on the processor 103). At step 601, the messaging system 209 initiates presentation of a selectable user interface. The selectable user interface may be included in a home screen of the computer system 100 and may be in the form of a message explorer associated with the messaging system 209 and/or the message aggregation database 207. As such, the messages of the message aggregation database 207 can be sorted via the message explorer using the menus. In certain embodiments, the menus are configured to be customized based on programs and/or based on a standard application programming interface between the messaging system 209 and a program 205. For example, a menu may have a standardized menu item for receiving textual input from a user. The menus may be utilized to sort the messages based on categorical fields associated with the messages. For example, in certain embodiments, the computer system 100 may be a mobile device. As such, the mobile device may have a home screen menu that includes a time/date, a name, a social network, settings for the mobile device, and the message explorer. The message explorer may be selected via the menu system. Further, the message explorer may be organized in the form of menus, submenus, and commands associated with applications. Thus, the message explorer may have an option to select submenus based on applications. Menus and submenus can be associated with messages of applications that lead to additional functions associated with one or more programs. For example, additional functions may include navigation of the application via menus (e.g., file, review, view, etc.) and/or selection of commands (e.g., open, highlight, close, select link, etc.) of the application. Further, in some scenarios, the navigation menus and submenus may be restricted to be presented on a same window of a graphical user interface. In this manner, the messaging interface is simplified for the user.

Then, at step 603, the messaging system 209 receives input highlighting a submenu of the selectable user interface. As noted above, the submenu may include additional submenus and/or commands that may be utilized to navigate the application menus. The menus and submenus may be broken up and nested in groups of a certain number of menu items (e.g., 1-7 menu items). In certain embodiments, the menu items can be structured in a manner that is easily recognizable by the user so the user can quickly navigate the menu items without need for receiving screen-reader compatible output from the computer system 100. In certain embodiments, each of the menu items may include messages that are screen-reader compatible. For example, menu items may be dynamic based on messages and/or static and associated with information that may be easily interpreted by a non-visual output (e.g., a text-to-speech engine or a Braille output application). Each of the menu items may be selectable and/or able to be highlighted using a scroll and click interface (e.g., scrolling using arrow keys). As submenus and/or commands are highlighted, the submenus and/or commands are presented to the user via a screen-reader compatible output to notify the user of the highlighted selection. When a submenu is selected, the messaging system 209 initiates presentation of the submenu (step 605). As such, one or more menu items may be presented via a screen-reader compatible output. Further, the user may select a menu item associated with a command. When selected, the messaging system 209 initiates execution of the command (step 607). The command may be one or more functions and/or sub-functions associated with the application.

Figure 7:
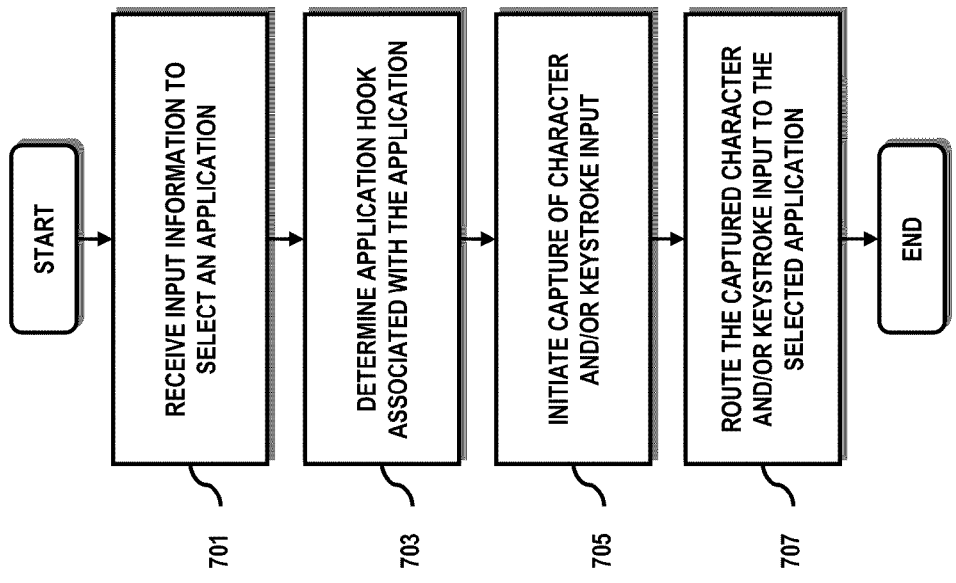
FIG. 7 is a flowchart of a process for inputting information to an application, according to an exemplary embodiment.

FIG. 7 is a flowchart of a process for inputting information to an application, according to an exemplary embodiment. For illustrative purposes, the process is described with reference to FIGS. 1 and 2. It is noted that the steps of the process may be performed in any suitable order, as well as combined or separated in any suitable manner. In certain embodiments, the messaging system 209 performs the process and executes on the computer system 100 (e.g., on the processor 103). As noted above, the user may select a command using the menu system. The command may include receiving an input from the user. At step 701, the messaging system 209 receives input information to select the application (e.g., via the menu system). In one embodiment, based on the selection, the messaging system 209 determines an application hook associated with the selected application to provide input to the application (step 703). In other embodiments, instead of hooking, the messaging system 209 uses another application programming interface to communicate with the application. The messaging system 209 may have permissions from the operating system or be a part of the operating system to communicate with the application. Then, at step 705, the messaging system 209 initiates capture of character and/or keystroke input. The messaging system 209 then routes the captured character and/or keystroke input to the selected application (step 707). The routing may be via the application hook or via the application programming interface.

FIG. 8 is a flowchart of a process for generating and sorting messages for presentation, according to an exemplary embodiment. For illustrative purposes, the process is described with reference to FIGS. 1 and 2A. It is noted that the steps of the process may be performed in any suitable order, as well as combined or separated in any suitable manner. In certain embodiments, the messaging system 209 performs the process and executes on the computer system 100 (e.g., via the processor 103 and utilizing the main memory 105). At step 801, the messaging system 209 receives a plurality of messages respectively associated with one of a plurality of programs. Each message may be formatted to be readily presented via non-visual communication to communicate the content of the respective message. Examples of non-visual communication include text-to-speech output and Braille output. Examples of a message that is formatted to be readily presented via a non-visual communication include messages with a payload of textual messages and/or messages including textual information as well as tags or identifiers that may be interpreted by a screen-reader. The messages may be formatted according to rules specifying one or more fields of information (e.g., a message type, an application identifier, a message identifier, textual information, a combination thereof, etc.). Further, the messages may be formatted in other manners and be in the form of data or information (e.g., display information, a web page, a log, e-mails, etc.).

The messages may be converted into a format compatible with non-visual communication using parts or all of the processes detailed in FIGS. 3 and 4. In one example, a message is associated with a web page and includes web page content. As noted in the discussion of FIG. 4, the web page content may include sections that may include textual information. The sections may additionally have titles (e.g., headers) associated with the textual information. The web page content can be parsed into the sections and portions of each section may be converted into messages, including the message. The message may additionally be associated with additional fields (e.g., a message identifier) that can be associated with the header or title of the web page. Each of the messages may then be stored in the message aggregation database 207 (step 803) as detailed in the discussion of FIG. 3. As noted above, the textual message information may be associated with other information (e.g., message type, message identifier, application identifier, etc.) when stored in the message aggregation database 207.

Next at step 805, the messaging system 209 sorts the messages based on a rule. In certain embodiments, the rule involves filtering the messages on message types associated with the messages. As noted above in the discussion of FIG. 3, the message types may include priority levels associated with the message. As such, only selected messages may be displayed in one view of a display of the message aggregation database 207. Non-filtered information may additionally be viewed in other views of the message aggregation database 207. Further, the filters may be selected via configuration settings of the messaging system 209. In this manner, the user may choose to view only messages associated with certain message types (e.g., priority levels). Further, at noted above in the discussions of FIGS. 3 and 5, the filtered message aggregation database 207 may be sorted for presentation based on timing information and/or other categories of information associated with messages stored in the message aggregation database 207. In certain embodiments, the sorting creates an additional instance of the message aggregation database 207 and/or a portion of the message aggregation database 207 as a working copy of the information to present. In other embodiments, an index of the message aggregation database 207 is utilized for sorting.

The messaging system 209 may also be utilized to select and present one of the sorted messages as detailed in FIGS. 5 and 6 (step 807). Further, the user may select and menu items, submenu items, and commands via the messaging system 209. Moreover, the selection may be based on a notification generated by the messaging system 209. As previously noted, the messaging system 209 may generate and present a notification that a new message is available. This notification may be based on a set of rules such as a rule specifying that notifications are only presented to the user for messages associated with a certain priority level, one or more message types, etc.

FIG. 9 is a diagram of user interfaces for viewing information from a message aggregation database, according to various exemplary embodiments. User interface 900 is a selectable user interface that represents an exemplary home screen menu that may be utilized to access messages of a message aggregation database 207. The application home screen includes information to present to a user such as time/date information 901, application names 903 that may be selected to provide submenus (e.g., a network selection menu 905), messages 907, and settings options 909. The network selection menu 905 may be an application that can be selected to present a network selection submenu 920. This may include lists of additional menus associated with network features, such as methods of receiving presentation of contacts (e.g., via a list, index, or search). The index and list menus may be traversed via selection menus while the search option may be utilized to receive input (e.g., via the processes of FIG. 7) associated with a search of the contacts list. Then, the messaging system 209 may interface between the network selection application and the network selection submenu 920. The network selection application may perform a search based on the input and return a set of messages associated with the search. The user is then presented with results 940 of the search. The search results are provided to the message aggregation database 207 from the network selection application and may be presented to the user via the messaging system 209.

Additionally or alternatively, the user may select to view messages 907 from the message aggregation database 207. The selection of the message view may be utilized to select a user interface view 960 into the message aggregation database 207. The user interface view 960 may be sorted using a reverse date order or via other categories (e.g., message type, message application, etc.). As such, the user is able to navigate messages to receive additional message information. Further, in certain embodiments, the each message may be associated with a message heading or summary. As such, when a message is highlighted, a screen-reader may be utilized to present the message heading or summary to the user. Then, the user may select one or more of the messages to retrieve additional textual content information associated with the messages. As noted above, the messages may be 100 percent screen-reader compatible.

Figure 10:
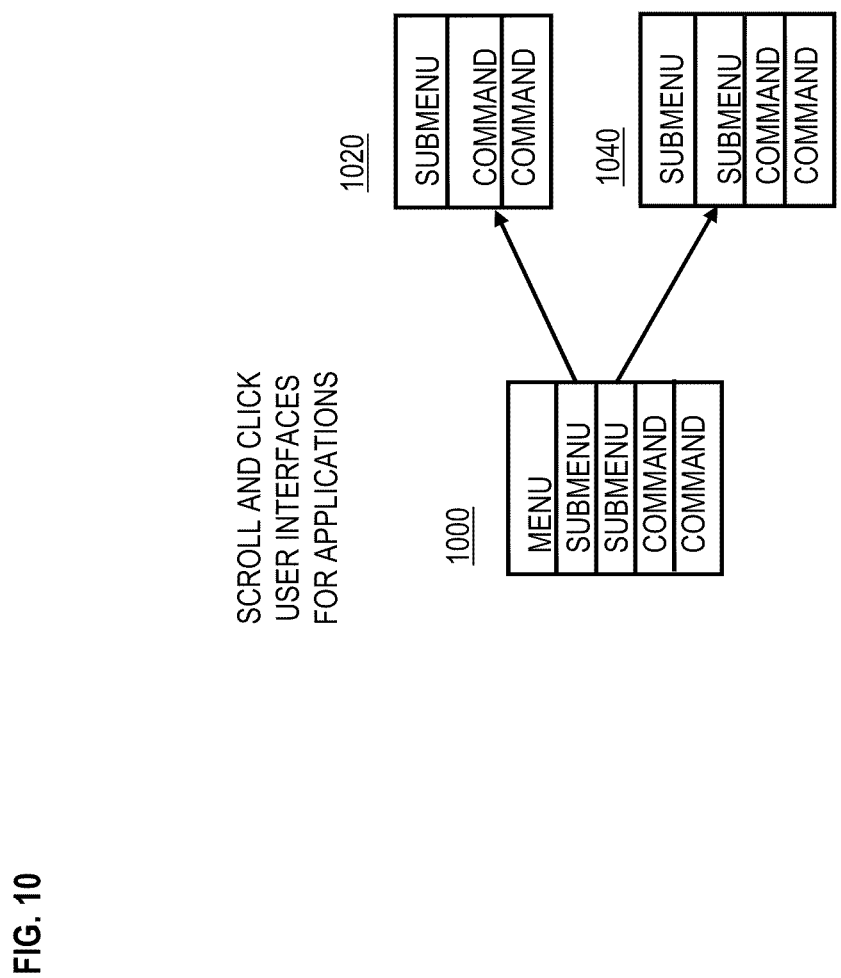

FIG. 10 is a diagram of user interfaces for viewing information from a message aggregation database, according to various exemplary embodiments. User interface 1000 is an exemplary messaging user interface 201 for an application that may be compatible with the messaging system 209. The user interface 1000 includes submenus and commands that may be utilized to present information to the user. Submenus 1020, 1040 may be utilized to select other submenus or to select commands. As such, when a submenu is selected, the messaging system 209 may communicate with the application to determine the next list of submenus and/or commands to presents. As such, the application can respond with messages including the menus and/or commands. Further, certain commands may be utilized to enter input to the application to receive dynamic messages as further detailed above in the description of FIG. 7.

With the above approaches, a messaging system 209 is used to interface a user with one or more applications via a message aggregation database 207. The application may be use an application programming interface provided by the messaging system 209 to update the message aggregation database 207 and to allow communications with a user. As such, applications with complex user interfaces may be simplified to messages that are screen-reader compatible to provide application messages that be interpreted in a non-visual output (e.g., Braille or text-to-speech) and services to the user. In this manner, a visually impaired user may utilize the services of complex applications.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:

associating each received message, out of a received plurality of messages, with an application hook, wherein each of the plurality of messages is associated with an application that generated the message using a message application identifier;

formatting the plurality of messages, based on the application hook, into a standard textual format that is configured to be output in a non-visual manner;

determining, based on the application hook, a message priority level and a message type of the plurality of messages, wherein the plurality of messages each is associated with a corresponding message type that includes a message type identifier and a descriptive message type name;

storing the plurality of messages in a common message database according to a timing information corresponding to receipt of the messages, wherein the plurality of messages are stored in the common message database in aggregation based on the timing information, and wherein the stored plurality of messages each includes a payload that specifies textual information and a message identifier that is a summary of the payload;

retrieving a subset of the stored plurality of messages based on the timing information of receipt;

filtering the subset of messages based on the message type, wherein the message type identifier is associated with one more priority levels that identify a frequency of update of the message type or identify an importance of the message based on the descriptive message type name, wherein filtering comprises filtering out one or more messages of the subset of messages having other than desired levels; and outputting the filtered messages to a non-visual communication program for presentation of the filtered messages.

2. A method of claim 1, wherein the filtering is based on a predetermined rule that specifies the message type and the timing information.

3. A method of claim 1, further comprising:

sorting the filtered messages according to one of the timing information, the message type, the message identifier, or a combination thereof.

4. A method of claim 3, further comprising:

initiating presentation of a selectable user interface that includes a plurality of menu items corresponding a plurality of sorting criteria.

5. A method of claim 4, further comprising:

receiving input specifying selection of one of the menu items, wherein the one menu item has an associated application command; and causing execution of the application command.

6. A method of claim 1, wherein the non-visual communication program includes a screen-reader program.

7. An apparatus comprising:

a processor; and a memory including computer program code, the memory and the computer program code configured to, with the processor, cause the apparatus to perform at least the following, associate each received message, out of a received plurality of messages, with an application hook, wherein each of the plurality of messages is associated with an application that generated the message using a message application identifier, format the plurality of messages, based on the application hook, into a standard textual format that is configured to be output in a non-visual manner, determine, based on the application hook, a message priority level and a message type of the plurality of messages, wherein the plurality of messages each is associated with a corresponding message type that includes a message type identifier and a descriptive message type name, store the plurality of messages in a common message database according to a timing information corresponding to receipt of the messages, wherein the plurality of messages are stored in the common message database in aggregation based on the timing information, and wherein the stored plurality of messages each includes a payload that specifies textual information and a message identifier that is a summary of the payload, retrieve a subset of the stored plurality of messages based on the timing information of receipt, filter the subset of messages based on the message type, wherein the message type identifier is associated with one more priority levels that identify a frequency of update of the message type or identify an importance of the message based on the descriptive message type name, wherein filtering comprises filtering out one or more messages of the subset of messages having other than desired levels, and output the filtered messages to a non-visual communication program for presentation of the filtered messages.

8. An apparatus of claim 7, wherein the filtering is based on a predetermined rule that specifies the message type and the timing information.

9. An apparatus of claim 7, wherein the processor is further configured to:

sort the filtered messages according to one of the timing information, the message type, the message identifier, or a combination thereof.

10. An apparatus of claim 9, wherein the processor is further configured to:

initiate presentation of a selectable user interface that includes a plurality of menu items corresponding a plurality of sorting criteria.

11. An apparatus of claim 10, wherein the process is further configured to:

receive input specifying selection of one of the menu items, wherein the one menu item has an associated application command; and cause execution of the application command.

12. An apparatus of claim 7, wherein the non-visual communication program includes a screen-reader program.

13. A non-transitory computer-readable storage medium carrying one or more sequences of one or more instructions which, when executed by one or more processors, cause an apparatus to at least perform the following steps:

associate each received message, out of a received plurality of messages, with an application hook, wherein each of the plurality of messages is associated with an application that generated the message using a message application identifier;

format the plurality of messages, based on the application hook, into a standard textual format that is configured to be output in a non-visual manner;

determine, based on the application hook, a message priority level and a message type of the plurality of messages, wherein the plurality of messages each is associated with a corresponding message type that includes a message type identifier and a descriptive message type name;

store the plurality of messages in a common message database according to a timing information corresponding to receipt of the messages, wherein the plurality of messages are stored in the common message database in aggregation based on the timing information, and wherein the stored plurality of messages each includes a payload that specifies textual information and a message identifier that is a summary of the payload;

retrieve a subset of the stored plurality of messages based on the timing information of receipt;

filter the subset of messages based on the message type, wherein the message type identifier is associated with one more priority levels that identify a frequency of update of the message type or identify an importance of the message based on the descriptive message type name, wherein filtering comprises filtering out one or more messages of the subset of messages having other than desired levels; and output the filtered messages to a non-visual communication program for presentation of the filtered messages.

14. A non-transitory computer-readable storage medium of claim 13, wherein the filtering is based on a predetermined rule that specifies the message type and the timing information.

15. A non-transitory computer-readable storage medium of claim 13, wherein the apparatus is further caused to:

sort the filtered messages according to one of the timing information, the message type, the message identifier, or a combination thereof.

16. A non-transitory computer-readable storage medium of claim 15, wherein the apparatus is further caused to:

initiate presentation of a selectable user interface that includes a plurality of menu items corresponding to a plurality of sorting criteria.

17. A non-transitory computer-readable storage medium of claim 16, wherein the apparatus is further caused to:

receive input specifying selection of one of the menu items, wherein the one menu item has an associated application command; and cause execution of the application command.

* * * * *